2,800,488
STABILIZATION OF 3,4-DIHYDRO-2-FORMYL-2H-PYRAN

Howard R. Guest, Charleston, and Ben W. Kiff, Ona, W. Va., assignors to Union Carbide Corporation, a corporation of New York No Drawing. Application June 23, 1955,
Serial No. 517,648

10 Claims. (Cl. 260—345.9)

This invention relates to new compositions of matter and particularly to new compositions of matter comprising 3,4-dihydro-2-formyl-2H-pyran.

It is known that acrolein reacts with itself by a Diels-Alder reaction to form 3,4-dihydro-2-formyl-2H-pyran, or, as it is commercially known, acrolein dimer. This acrolein dimer has many commercial uses but its more extended use has been limited because of its unsatisfactory storage characteristics. Acrolein dimer on storage tends to aldolize and polymerize and change from a clear water-white mobile liquid to a viscous material, and in some instances, over a long enough period or at a high enough temperature, to a solid. This polymerization is further catalyzed by various basic substances, such as sodium hydroxide, potassium hydroxide and calcium hydroxide; traces of inorganic mineral acids, such as hydrochloric acid and sulfuric acid; and salts of various metals, such as the salts of copper and tin.

Heretofore acrolein dimer has generally been shipped and stored in glass containers since aldolization and polymerization does not proceed as rapidly in glass as in containers fabricated of other materials. Even so storage of a commercially pure acrolein dimer (99%) in clear glass bottles at 25° C. for 97 days showed that about 22 percent by weight of the dimer reacted with itself to form higher molecular weight products, and when stored at 50° C. for 80 days about 47 percent by weight had reacted; as determined by chemical analysis for carbonyl content.

This aldolization and polymerization of the acrolein dimer is especially undesirable when the acrolein dimer is to be used to prepare aqueous solutions of 2-hydroxyadipaldehyde by hydrolysis of the acrolein dimer. Hydrolysis of acrolein dimer which has been stored for as little as 10 days at room temperature gives a 2-hydroxyadipaldehyde solution containing a voluminous sticky precipitate which is very difficult to remove by filtration. When dimer which has been stored for longer periods of time or at higher temperatures is hydrolyzed, the amount of this objectionable insoluble matter is further increased. This insoluble material is not obtained when freshly distilled acrolein dimer is hydrolyzed.

Samples of acrolein dimer which initially had a refractive index of 1.4583 at 30° C. percent unsaturation of 99.8, and percent carbonyl of 99.7, as determined by chemical analyses, when stored at 25° C. for various periods of time in different type containers and then reanalyzed show that appreciable polymerization to the aldol occurs in the absence of a stabilizer. The extent of this aldolization varies depending on the type of container used and the length of time the samples have been stored. It was also found that to some extent the aldolization is a reversible reaction, since on distillation of the test samples at the end of the storage period the amount of acrolein dimer recovered was usually greater than the amount of dimer indicated by the carbonyl analysis before distillation. However, a sample stored in a terne-plate steel can, in which the plate is a lead-tin alloy, yielded no dimer on distillation; it is believed that either the alloy or one of the metal constituents catalyzes the polymerization of acrolein dimer to higher molecular weight products which do not decompose to acrolein dimer on heating.

When the storage temperature is raised to 50° C. the degree of aldolization and polymerization to higher molecular weight products is even more pronounced and it is not possible to recover very much of the dimer by distillation; apparently because the higher temperature influences the formation of higher molecular weight polymers.

It is an object of this invention to provide compositions of 3,4-dihydro-2-formyl-2H-pyran which have improved stability on storage. Another object is to provide, 3,4-dihydro-2-formyl-2H-pyran compositions which even after long storage will on hydrolysis provide a source of 2-hydroxyadipaldehyde in good yield.

We have now found that stable compositions of 3,4-dihydro-2-formyl-2H-pyran can be prepared in incorporating therein a small amount of an iron oxide, and preferably in finely divided form.

The iron oxides useful in this invention are ferrous oxide (FeO), ferrosoferric oxide ($Fe_3O_4$, magnetite), ferric oxide ($Fe_2O_3$, hematite), iron rust ($Fe_3O_4 \cdot XH_2O$), and mixtures of such oxides. The selected oxide, in the form of a fine powder, can be mixed with the acrolein dimer in any suitable manner. Since the iron oxides are relatively insoluble in acrolein dimer, the dimer and the oxides are thoroughly mixed before storage to secure optimum stabilizing effect. The amount of iron oxide required is not narrowly critical. It can be added to the acrolein dimer in amounts from about 0.01 percent to about 5 percent, based on the weight of the acrolein dimer. Higher amounts may be used without detriment, but for reasons of economy it is preferred to use a lesser amount so long as it achieves the desired results. The amount commonly used will vary from about 0.1 percent to about 2 percent based on the weight of acrolein dimer.

The iron oxide preferably should have as small a particle size as possible in order to present a large surface area and also because the smaller the particle size the slower the rate at which the oxide settles to the bottom of the container. Pigment grade iron oxides and particularly the synethetic iron oxides have a satisfactory degree of fine particle size, usually averaging less than 1 micron. However, stabilization can be obtained with particles up to about 20 mesh in size, using standard screens.

If desired the stabilizer can be removed by filtration, or by distillation, of the acrolein dimer; in addition any other suitable method known to the art may be employed, such as centrifugation. In cases where the presence of the stabilizer will not interfere with the use of the acrolein dimer it is not necessary to remove it.

We have found that an iron oxide content of about 0.1 percent has efficiently stabilized acrolein dimer at 25° C. stored in a glass container against excessive aldolization and polymerization for periods as long as 405 days. We have also found that at elevated temperatures of 50° C. and 100° C. the iron oxides are much more effective stabilizers than any of the stabilizers heretofore proposed for stabilizing acrolein dimer. We have further found that the iron oxide stabilized acrolein dimer is not limited to storage in glass containers, but that it can be satisfactorily stored and shipped in carbon steel drums and stainless steel drums.

The following examples illustrate the utility and the outstanding advantages of this invention. All parts are by weight unless otherwise specified.

Example 1

A clear glass bottle was charged with 99.9 parts of 3,4-dihydro-2-formyl-2H-pyran having a refractive index of 1.4590 at 30° C., a carbonyl content of 99.8 percent, and an unsaturation of 99.7 percent. To it was added 0.1 part of $Fe_2O_3$ and the bottle was capped and shaken to evenly disperse the ferric oxide in the 3,4-dihydro-2-formyl-2H-pyran. The ferric oxide consisted of a finely ground powder averaging less than 1 micron in diameter. The bottle was stored at 25° C. and portions were removed therefrom after 202 and 405 days and analyzed. Prior to the analysis the ferric oxide was removed by filtration. The results of our tests are listed below.

| Days stored | 202 | 405 |
|---|---|---|
| $N_D^{30}$ | 1.4612 | 1.4615 |
| Percent carbonyl | 97.3 | 97.0 |
| Percent Unsaturation | 96.6 | 95.5 |

Examples 2 to 10 inclusive, summarized in Table I below, were carried out in the same manner as described in Example I.

TABLE I (Part 1)

| Ex. | Inhibitor | Temp., °C. | Time stored | $N_D^{30}$ | Percent Carbonyl | Percent Unsaturation |
|---|---|---|---|---|---|---|
| 2 | 1.0% $Fe_3O_4$ | 25 | 106 days | 1.4605 | 98.5 | 97.3 |
| 3 | 1.0% $Fe_2O_3$ | 25 | do | 1.4622 | 98.2 | 96.9 |
| 4 | 0.1% $Fe_3O_4$ | 25 | do | 1.4602 | 97.5 | 96.8 |
| 5 | 0.1% $Fe_2O_3$ | 25 | do | 1.4602 | 98.3 | 96.6 |
| 6 | 1.8% Iron Rust | 50 | 40 days | 1.4748 | 89.1 | 91.7 |
| 7 | 0.1% $Fe_2O_3$ | 50 | 77 days | 1.4825 | 93.3 | 86.7 |
| 8 | 1.0% $Fe_3O_4$ | 100 | 213 hours | 1.4685 | | 92.7 |
| 9 | 1.0% $Fe_2O_3$ | 100 | do | 1.4698 | 91.7 | 94.4 |
| 10 | 0.1% $Fe_2O_3$ | 100 | 238 hours | 1.4672 | 91.1 | 88.5 |

TABLE I (Part 2)

| Ex. | Time stored | $N_D^{30}$ | Percent Carbonyl | Percent Unsaturation | Percent Recovered as Good Dimer by Distillation |
|---|---|---|---|---|---|
| 6 | 81 days | 1.4852 | 84.9 | 88.2 | 67.5 |
| 7 | 161 days | 1.5008 | 80.5 | 73.4 | Not distilled. |
| 8 | 314 hours | 1.4748 | 89.1 | 90.1 | 72.4 |
| 9 | 314 hours | 1.4750 | 89.4 | 89.7 | 62.1 |
| 10 | 310 hours | 1.4698 | 90.6 | 87.1 | 75.2 |

The iron oxides, $Fe_2O_3$ and $Fe_3O_4$, were pigment grade material having a particle size averaging less than 1 micron. The iron rust was obtained from iron which had been exposed to oxidizing conditions and ground to a particle size of less than about 20 mesh.

Acrolein dimer stabilized with the iron oxide stabilizers of our invention when hydrolyzed to 2-hydroxyadipaldehyde after storage in a glass container was found to yield an easily filterable solution of the aldehyde and the amount of insoluble higher molecular weight polymer present in the solution was appreciably less than was found when no stabilizer was present, or when oxalic acid was used as stabilizer. The results obtained after storing at 25° C. are summarized in Table II.

TABLE II

| Stabilizer | No. of Days Stored | Percent of Dimer to Polymer Insoluble in Aldehyde Solution | Percent Yield Hydroxyadipaldehyde |
|---|---|---|---|
| 0.1% Oxalic | 36 | 2.0 | 91.3 |
|  | 84 | 3.0 | 96.9 |
| 0.1% $Fe_2O_3$ | 35 | 0.5 | 97.8 |
|  | 75 | 1.0 | 96.9 |
|  | 123 | 1.0 | 97.4 |
| None | 112 | 28.0 | 71.4 |

None of the stabilizing agents previously employed were as effective as iron oxide in stabilizing acrolein dimer. Among the stabilizers heretofore used may be mentioned tannic acid, oxalic acid, hydroquinone, and acidic materials having at least one dissociable hydrogen atom and an acid dissociation constant of at least $1 \times 10^{-7}$ as determined in aqueous medium. While some improvement in storage stability was observed with these at 25° C. there was little stabilizing effect noticed at elevated temperatures. The results obtained with said stabilizing agents are summarized in Table III after storage in a glass container at the temperatures and times indicated.

TABLE III (Part 1)

| Run No. | Inhibitor | Temp., °C. | Time Stored | $N_D^{30}$ | Percent Carbonyl | Percent Unsaturation |
|---|---|---|---|---|---|---|
| 1 | 0.1% Oxalic | 25 | 69 days | 1.4628 | 95.7 | 95.4 |
| 2 | do | 25 | do | 1.4632 | 95.8 | 96.2 |
| 3 | 0.1% Oxalic, 0.1% Hydroquinone. | 25 | do | 1.4635 | 96.2 | 95.8 |
| 4 | do | 25 | do | 1.4635 | 95.9 | 94.1 |
| 5 | 0.1% Oxalic Acid, 0.1% Hydroquinone. | 50 | 65 days | 1.4935 | 84.8 | 76.8 |
| 6 | 0.1% Oxalic | 100 | 101 hrs | | 83.3 | 77.4 |
| 7 | do | 50 | 66 days | 1.4910 | 83.2 | 82.1 |
| 8 | do | 100 | 170 hrs | 1.4862 | 83.2 | 81.9 |
| 9 | 0.5% Oxalic | 100 | do | 1.4955 | 64.5 | 70.9 |

TABLE III (Part 2)

| Run No. | Time | $N_D^{30}$ | Percent Carbonyl | Percent Unsaturation | Percent recovered as Good Dimer by Distillation |
|---|---|---|---|---|---|
| 1 | 83 days | 1.4632 | 95.6 | 95.8 | 95.6 |
| 2 | 97 days | 1.4635 | 95.2 | 95.9 | 97.4 |
| 3 | do | 1.4638 | 94.1 | 97.2 | 97.4 |
| 4 | 90 days | 1.4642 | 96.5 | 94.1 | 96.5 |
| 5 | 86 days | 1.5002 | 69.2 | 75.4 | None |
| 6 | 140 hrs | 1.5072 | 42.5 | 70.8 | 26.4 |
| 7 | 82 days | 1.4958 | 72.1 | 81.5 | 58.2 |
| 8 | 306 hrs | 1.5098 | 14.9 | 55.5 | 23.0 |
| 9 | do | Solid—not analyzed | | | |

It was also found that hydrolysis of acrolein dimer so stabilized with oxalic acid, tannic acid and hydroquinone to 2-hydroxyadipaldehyde gave an aqueous solution containing an appreciable amount of voluminous sticky precipitate which was difficult to remove.

What is claimed is:

1. A composition of matter comprising 3,4-dihydro-2-formyl-2H-pyran and a small amount of an oxide of iron, said small amount being sufficient to stabilize said pyran on storage.

2. A composition of matter comprising 3,4-dihydro-2-formyl-2H-pyran and an iron oxide in an amount from 0.01 to 5 parts per 100 parts of the pyran by weight to stabilize said pyran.

3. A composition of matter comprising 3,4-dihydro-2-formyl-2H-pyran and from 0.1 to 2 percent by weight of $Fe_3O_4$ as stabilizer.

4. A composition of matter comprising 3,4-dihydro-2-formyl-2H-pyran and from 0.1 to 2 percent by weight of FeO as stabilizer.

5. A composition of matter comprising 3,4-dihydro-2-formyl-2H-pyran and from 0.1 to 2 percent by weight of $Fe_2O_3$ as stabilizer.

6. A composition of matter comprising 3,4-dihydro-2-formyl-2H-pyran and from 0.1 to 2 percent by weight of iron rust, which is a hydrate of $Fe_3O_4$, as stabilizer.

7. The method of storing 3,4-dihydro-2-formyl-2H-pyran over prolonged periods of time which comprises incorporating in said pyran from about 0.01 to about 5 parts by weight of an iron oxide per 100 parts of the pyran.

8. The method of stabilizing 3,4-dihydro-2-formyl-2H-pyran (acrolein dimer) which comprises adding thereto an amount of an iron oxide from about 0.01 to about 5 parts by weight per 100 parts by weight of the pyran and storing said iron oxide stabilized pyran in a container inert to the solvent effect of the pyran, said container having an inner surface selected from the group consisting of glass, carbon steel and stainless, in contact with the pyran.

9. A composition of matter comprising 3,4-dihydro-2-formyl-2H-pyran and an iron oxide in an amount from 0.01 to 5 parts per 100 parts of the pyran by weight to stabilize said pyran, said iron oxide having an average particle size not exceeding about 20 mesh.

10. A method of inhibiting polymerization of 3,4-dihydro-2-formyl-2H-pyran, which comprises incorporating in said pyran an amount of an iron oxide sufficient to stabilize said pyran on storage.

References Cited in the file of this patent

UNITED STATES PATENTS

| | | |
|---|---|---|
| 2,514,688 | Whetstone | July 11, 1950 |
| 2,537,579 | Fountain | Jan. 9, 1951 |
| 2,610,193 | Whetstone | Sept. 9, 1952 |

OTHER REFERENCES

Schulz: Angewandte Chem., vol. 62, pp. 110–111 (1950).

Moureu et al.: Compt. rendu., vol. 169, pp. 705–708 (1919).